(12) United States Patent
Oesterling

(10) Patent No.: US 9,084,118 B2
(45) Date of Patent: Jul. 14, 2015

(54) CONTROLLING ACCESS TO A MOBILE DEVICE

(71) Applicant: General Motors LLC, Detroit, MI (US)

(72) Inventor: Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 160 days.

(21) Appl. No.: 13/804,807

(22) Filed: Mar. 14, 2013

(65) Prior Publication Data

US 2014/0273955 A1   Sep. 18, 2014

(51) Int. Cl.
  *H04M 3/16*   (2006.01)
  *H04W 12/08*   (2009.01)
  *H04L 29/06*   (2006.01)

(52) U.S. Cl.
  CPC ........... *H04W 12/08* (2013.01); *H04L 63/0853* (2013.01); *H04L 63/107* (2013.01)

(58) Field of Classification Search
  CPC ......... H04W 12/08; H04W 4/02; H04W 4/04; H04L 63/107; H04L 63/0853; H04L 63/0227; H04L 63/0492
  USPC .................... 455/410, 411, 414.1, 41.1, 41.2; 713/175
  See application file for complete search history.

(56) References Cited

U.S. PATENT DOCUMENTS

| | | | |
|---|---|---|---|
| 6,748,195 B1 * | 6/2004 | Phillips | 455/41.2 |
| 2005/0037733 A1 * | 2/2005 | Coleman et al. | 455/411 |
| 2011/0086615 A1 * | 4/2011 | Golder | 455/411 |
| 2011/0225426 A1 | 9/2011 | Agarwal et al. | |
| 2013/0012179 A1 * | 1/2013 | Watkins et al. | 455/418 |
| 2013/0130654 A1 * | 5/2013 | Kasad et al. | 455/411 |
| 2013/0254831 A1 * | 9/2013 | Roach et al. | 726/1 |
| 2014/0187200 A1 * | 7/2014 | Reitter et al. | 455/410 |
| 2014/0230040 A1 * | 8/2014 | Crowther et al. | 726/10 |
| 2014/0282877 A1 * | 9/2014 | Mahaffey et al. | 726/3 |

FOREIGN PATENT DOCUMENTS

GB   2478653   9/2011

OTHER PUBLICATIONS

"Idea: Location Based Security Lock—MAcRumors Forums", located at http://forums.macrumors.com/showthread.php?t=730772; Jun. 23, 2009; 3 pages.*

* cited by examiner

*Primary Examiner* — Kamran Afshar
*Assistant Examiner* — Mong-Thuy Tran
(74) *Attorney, Agent, or Firm* — Anthony Luke Simon; Reising Ethington P.C.

(57) ABSTRACT

A method of controlling user access to a mobile device includes detecting at the mobile device the presence of a wireless device via a short-range wireless signal; identifying the wireless device from the wireless signal; accessing at the mobile device a list that includes the identity of one or more trusted wireless devices and is stored at the mobile device; comparing the identity of the detected wireless device with the identity or identities include with the list of trusted wireless devices; determining that the identity of the detected wireless device is included with the list of trusted wireless devices; and deactivating a passcode requirement used by the mobile device based on the determination that the identity of the detected wireless device is included with the list of trusted wireless devices.

17 Claims, 2 Drawing Sheets

US 9,084,118 B2

CONTROLLING ACCESS TO A MOBILE DEVICE

TECHNICAL FIELD

The present invention relates to mobile devices and more particularly to controlling access to such devices.

BACKGROUND

Mobile devices offer users the ability to wirelessly communicate with others and have become increasingly popular. These devices have traditionally permitted the user to place and receive telephone calls. However, mobile devices have become increasingly sophisticated and now include a wide variety of information/data, such as email messages, SMS messages, and photographs, for example. Given that the amount of information found on the mobile device has increased, and at least in some cases has become more sensitive, mobile devices are sometimes locked to prevent access. Unlocking the mobile device frequently calls for inputting a valid passcode to gain access to information and/or features of the mobile device.

In some situations, requiring entry of the passcode each time a user wants to accesses the mobile device can be unnecessary and time consuming. In many applications, the mobile device restricts access to its information and/or features after the device has been inactive for more than a predetermined amount of time (e.g., >1 minute). But mobile device users may want to temporarily deactivate the passcode. For instance, the user may be in a environment where he or she accesses the mobile device relatively frequently and security is less of a concern. In that case, a low security threat to the mobile device along with the burden of entering a passcode may justify temporarily disabling the passcode requirement. However, many email servers have security policies in place that do not permit the user to deactivate the passcode requirement and even when such deactivation is allowed the user would have to modify the settings of the mobile device to suspend the passcode requirement and then remember to re-activate the passcode requirement later. If the user forgot to re-activate the passcode requirement, the information stored on the mobile device could be unsafe when the phone is no longer located in the low-security environment.

SUMMARY

According to an embodiment of the invention, there is provided a method of controlling user access to a mobile device. The method includes detecting at the mobile device the presence of a wireless device via a short-range wireless signal; identifying the wireless device from the wireless signal; accessing at the mobile device a list that includes the identity of one or more trusted wireless devices; comparing the identity of the detected wireless device with the identity or identities included with the list of trusted wireless devices; determining that the identity of the detected wireless device is included with the list of trusted wireless devices; and deactivating a passcode requirement used by the mobile device based on the determination that the identity of the detected wireless device is included with the list of trusted wireless devices.

According to another embodiment of the invention, there is provided a method of controlling user access to a mobile device. The method includes designating a vehicle telematics unit as a trusted wireless device using a mobile device; establishing a short-range wireless link between the vehicle telematics unit and the mobile device after designating the vehicle telematics unit as a trusted wireless device; detecting that the short-range wireless link currently exists between the vehicle telematics unit and the mobile device; and deactivating a passcode requirement used by the mobile device while the short-range wireless link exists between the mobile device and the vehicle telematics unit.

According to yet another embodiment of the invention, there is provided a method of controlling user access to a mobile device. The method includes detecting at the mobile device the presence of a vehicle telematics unit via a short-range wireless signal; identifying the vehicle telematics unit from the short-range wireless signal; accessing at the mobile device a list that includes the identity of one or more trusted wireless devices; comparing the identity of the vehicle telematics unit with the identity or identities included with the list of trusted wireless devices; determining that the identity of the vehicle telematics unit is included with the list of trusted wireless devices; determining that the mobile device and the vehicle telematics unit are located within a user-defined geo-fenced area; and deactivating a passcode requirement used by the mobile device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
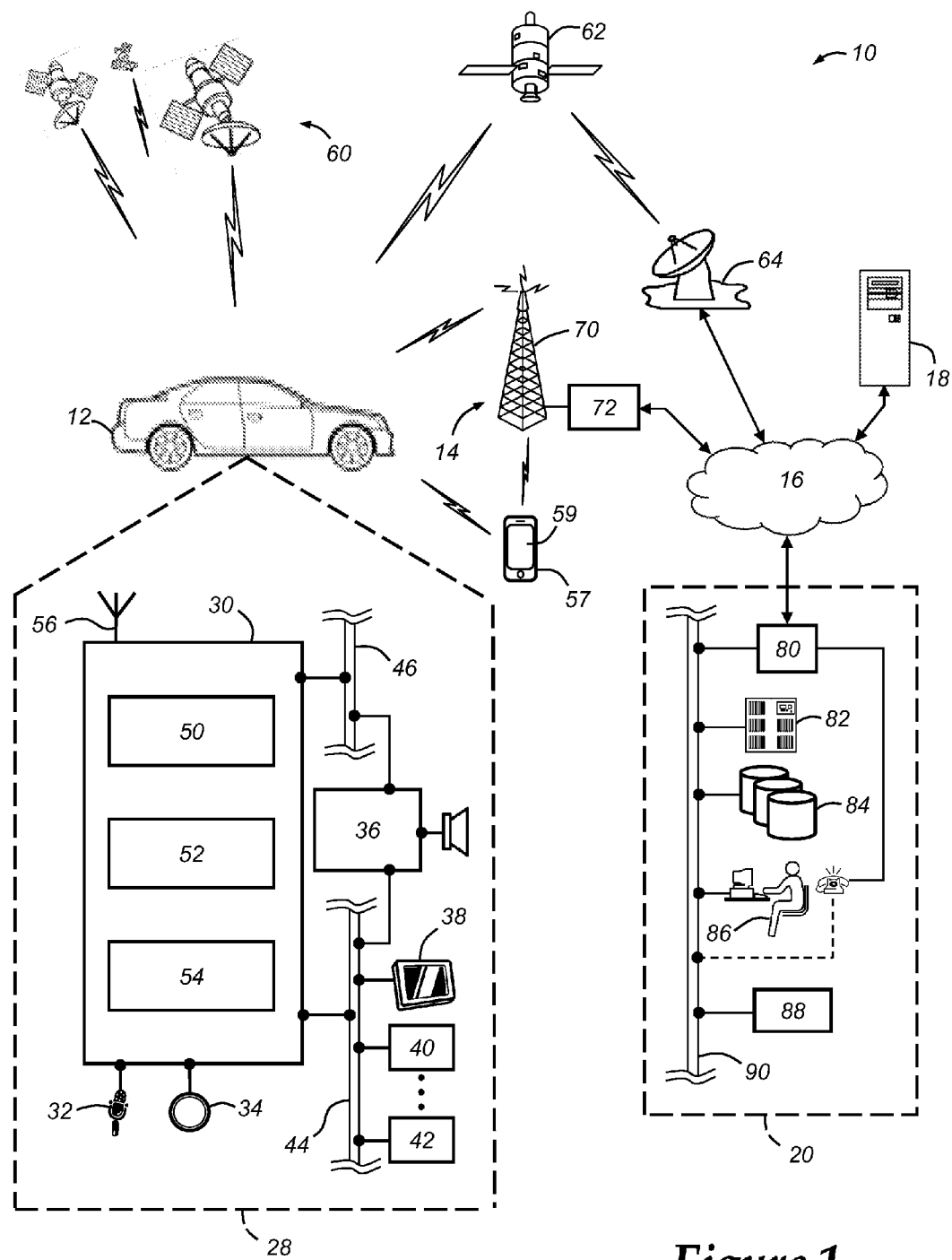
FIG. 1 is a block diagram depicting an embodiment of a communications system that is capable of utilizing the method disclosed herein.

The method described below controls access to a mobile device by selectively disabling a passcode requirement used by the mobile device based on the presence of a trusted wireless device. Mobile devices, such as smartphones, often require a passcode or password to gain access to the information and/or functions of the mobile devices. However, frequently accessing the device may require the entering and re-entering of the passcode/password even though the user only let the mobile device sit idle for a brief period of time (e.g., 2-3 minutes). Given that passwords/passcodes may include capitalized letters, numbers, and special symbols, entering these passwords/passcodes repetitively can be time consuming.

While mobile devices can use a passcode to limit access to information and/or features on the device, the passcode requirement can be temporarily disabled while the mobile device is in short-range wireless communication with a wireless device that has been identified as trusted. For instance, the user of the mobile device may own and use a wireless headset or a vehicle telematics unit equipped vehicle along with a mobile device. Both the wireless headset and the vehicle telematics unit can communicate via short-range wireless communication techniques (e.g., Bluetooth) and be identified as trusted devices. Trusted devices can be wireless devices the user owns and/or frequently uses with the mobile device.

When the mobile device is wirelessly communicating with one or more trusted wireless devices, the mobile device can temporarily deactivate its need for a passcode to access the information and/or features of the mobile device. Once the mobile device stops wirelessly communicating with the trusted wireless device, the mobile device can then reinstate its requirement that the user enter a passcode to access the mobile device. The presence of a trusted wireless device can decrease the chance that the mobile device will be accessed without authorization. Thus, the passcode is needed less than in other environments where the mobile device is used without a trusted wireless device. For example, the mobile device is less likely to be stolen and used together with its owner's wireless headset or vehicle than it would be when the mobile device is stolen and used alone. Nonetheless, it is also possible to incorporate additional safeguards. One possible safeguard can include establishing a geo-fenced area for deactivating the passcode instead of or along with the presence of a trusted wireless device. That is, a user of the mobile device can define a geographic area within which the mobile device can deactivate its passcode requirement. If the mobile device is moved outside of this geo-fenced area, the mobile device can maintain its passcode requirement. Thus, the mobile device can include a selectable option that disables the passcode requirement of the mobile device while the mobile device is in the presence of and/or paired with the trusted wireless device.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Android™ manufactured by Motorola, Inc. as well as others. While the smart phone 57 may include the ability to communicate via cellular communications using the wireless carrier system 14, this is not always the case. For instance, Apple manufactures devices such as the iPad™, iPad 2™, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of mobile device, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
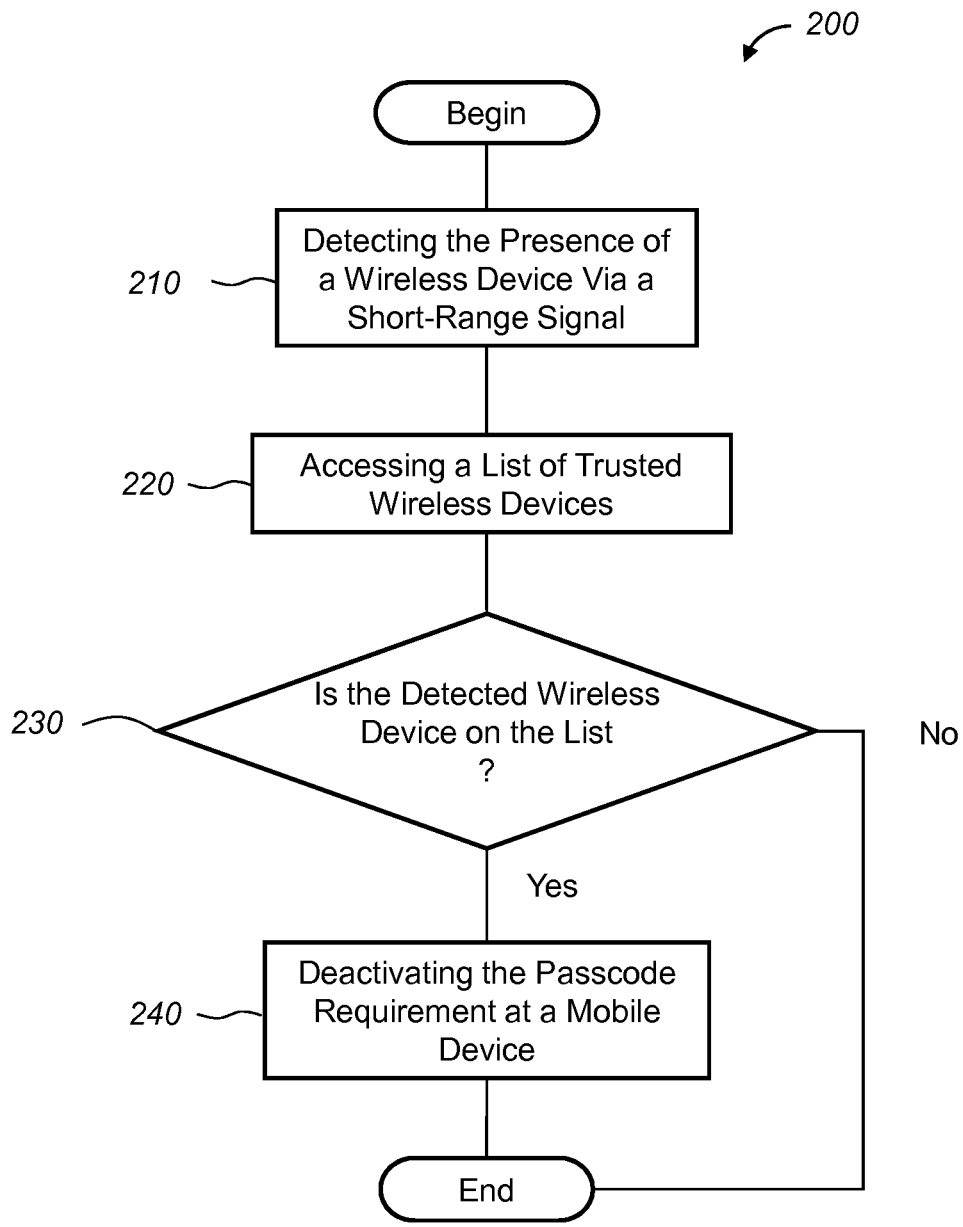
FIG. 2 is a flow chart depicting an embodiment of a method of controlling user access to a mobile device.

Turning now to FIG. 2, there is a method 200 of controlling user access to a mobile device. The method 200 begins at step 210 by detecting at the mobile device the presence of a wireless device or vehicle telematics unit 30 via a short-range wireless signal. While the mobile device is powered on, it can be directed to establish a short-range wireless connection with another wireless device, such as a wireless headset or the vehicle telematics unit 30. This can also be referred to as "paring" the mobile device with the wireless device/vehicle telematics unit 30. The description that follows will refer to the smart phone 57 as a mobile device and the vehicle telematics unit 30 as a wireless device. However, it should be appreciated that other types of mobile devices can be used with the systems and methods described herein other than smart phone 57. Similarly, other types of wireless devices besides the vehicle telematics unit 30 can be used, such as wireless headsets, wireless speakers, laptops, or other wireless devices that are capable of establishing a short-range wireless link.

As part of the process of establishing the short-range wireless link, the vehicle telematics unit 30 can be identified from the short-range wireless signal it broadcasts. For example, the vehicle telematics unit 30 can generate a short-range wireless signal that identifies the unit 30 to other wireless devices and mobile devices capable of communicating via short-range wireless protocols. The precise steps used to establish a short-range wireless link may vary depending on the short-range wireless protocol used, but in one example the vehicle telematics unit 30 can use a Bluetooth protocol and identify itself to the smart phone 57 via a short-range wireless signal that is broadcast by the unit 30. Once the smart phone 57 detects the presence of the short-range wireless signal broadcast by the vehicle telematics unit 30, the process of paring the vehicle telematics unit 30 and the smart phone 57 begins and the method 200 proceeds to step 220.

At step 220, a list is accessed at the smart phone 57 that includes the identity of one or more trusted wireless devices and is stored at the smart phone 57. Wireless devices, such as the vehicle telematics unit 30, can each include a unique identifier and be designated to be recognized by the smart phone 57 as a trusted wireless device. For example, when vehicle telematics unit 30 is initially paired with the smart phone 57, the smart phone 57 can be programmed to ask whether or not the user would like to designate the unit 30 as a trusted wireless device. Such as question can be shown on the display 59 of the smart phone 57 or audibly played through the audio system 36 of the vehicle 12. If the user replies that he or she would like the vehicle telematics unit 30 to be designated as a trusted wireless device, the smart phone 57 can store the identity of the vehicle telematics unit 30 in a non-volatile memory device used by the smart phone 57. However, it should be appreciated that a list of trusted wireless device may be stored somewhere else besides the smart phone 57, such as a cloud server or computer 18. The identifier used by the vehicle telematics unit 30 can include one or more strings of numbers and letters that uniquely identify the vehicle telematics unit 30, such as an Electronic Serial Number (ESN), International Mobile Subscriber Identity (IMSI), Mobile Identification Number (MIN), Mobile Dialed Number (MDN), or other similar identifier. The method 200 proceeds to step 230.

At step 230, the identity of the vehicle telematics unit 30 is compared with the identity or identities included with the list of trusted wireless devices. The smart phone 57 can perform a comparison between the identifier received from the vehicle telematics unit 30 as part of the process used to establish the short-range wireless link and based on that comparison determine whether the identity of the vehicle telematics unit 30 is included with the list of trusted wireless devices. That is, if a user has previously designated the vehicle telematics unit 30 as a trusted device, the smart phone 57 has saved the identity of the unit 30 at the smart phone 57. The identity of the vehicle telematics unit 30 can be saved at the smart phone 57—alone or along with identities of other wireless devices—as a list of wireless devices. As part of the process of pairing the smart phone 57 and the vehicle telematics unit 30, the smart phone 57 can search the list of trusted wireless devices to determine if identity of the unit 30 is included with the list. When the smart phone 57 determines that the identity of the vehicle telematics unit 30 is not included on the list, the method 200 ends. However, if the identity of the vehicle telematics unit 30 matches one of the identities included in the list of trusted wireless devices, the method 200 proceeds to step 240.

At step 240, a passcode requirement used by the smart phone 57 is deactivated. After determining that the vehicle telematics unit 30 is a trusted device, the smart phone 57 can temporarily bypass the passcode for accessing the features and/or data included with the smart phone 57. For instance, the smart phone 57 can determine that the short-range wireless link has been successfully established with the vehicle telematics unit 30. Once the short-range wireless link has been established with a trusted device, such as the vehicle telematics unit 30, the smart phone 57 can deactivate its passcode requirement. And how long the passcode is deactivated can be controlled by a number of factors. In one example, the smart phone 57 can deactivate the passcode requirement so long as the smart phone 57 is linked to the vehicle telematics unit 30 via the short-range wireless link (e.g., using Bluetooth). Once the smart phone 57 is no longer paired with the vehicle telematics unit 30, the smart phone 57 can detect the absence of the short-range wireless link with a trusted device and return to asking a user to enter a passcode before providing access to the smart phone 57 after the phone 57 has been left idle for a predetermined amount of time (e.g., >1 minute).

It is also possible to determine whether or not the smart phone 57 and the vehicle telematics unit 30 are located within a user-defined geo-fenced area and deactivate the passcode requirement based on this determination. A user can define a geographic area and permit deactivation of the passcode while the smart phone 57 is located within the user-defined geo-fence. The geo-fence can take different forms and can be stored by the user at the smart phone 57. For example, the geo-fence can be a geo-political boundary, such as a city or a state, or the geo-fence can be a custom-defined area. In the case of the custom-defined area, the user can more particularly define the geo-fence to suit him or her needs. In one example, the user could define the custom-defined are to be the roadways driven between the user's home and place of employment. The smart phone 57 can receive information defining the geo-fence using the display 59 and that information can then be stored in a memory device at the smart phone 57. The smart phone 57 (as well as other types of mobile devices) often carries GPS chipsets capable of monitoring the location of the smart phone 57. As the user moves with the smart phone 57, the smart phone 57 can compare its present location with the area defined by the geo-fence. If the present location is within the user-defined geo-fence, the smart phone 57 can set a flag that deactivates the passcode. When the smart phone 57 detects that it has moved outside of the geo-fence, the smart phone 57 can then reset the flag or otherwise reinstate the passcode requirement. It is possible to deactivate the passcode requirement solely based on whether or not the smart phone 57 is located within the user-defined geo-fence. But it is also possible to disable the passcode requirement only when the smart phone 57 detects that it is currently wirelessly linked with the vehicle telematics unit 30 and that it is currently located within the user-defined geo-fence. In such an implementation, if the smart phone 57 determines that short-range wireless link has ended or that the smart phone 57 has moved outside of the user-defined geo-fence, then the smart phone 57 can reinstate its passcode requirement. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling user access to a mobile device, comprising the steps of:
    (a) detecting at the mobile device the presence of a wireless device via a short-range wireless signal;
    (b) identifying the wireless device from the wireless signal;
    (c) accessing at the mobile device a list that includes the identity of one or more trusted wireless devices;
    (d) comparing the identity of the detected wireless device with the identity or identities included with the list of trusted wireless devices;
    (e) determining that the identity of the detected wireless device is included with the list of trusted wireless devices;
    (f) determining that the mobile device is located within a user-defined geofence; and
    (g) deactivating a passcode requirement used by the mobile device based on the determination of steps (e) and (f).

2. The method of claim 1, further comprising the step of detecting the presence of the wireless device based on the existence of a short-range wireless link between the mobile device and the wireless device.

3. The method of claim 1, further comprising the step of re-activating the passcode requirement used by the mobile device when the wireless device is no longer in the presence of the mobile device or the mobile device leaves the user-defined geofence.

4. The method of claim 1, wherein the mobile device further comprises a smart phone.

5. The method of claim 1, wherein the wireless device further comprises a vehicle telematics unit.

6. The method of claim 1, further comprising the step of designating the wireless device as trusted during an initial wireless pairing in response to input from a user of the mobile device.

7. The method of claim 1, further comprising the step of receiving the geo-fence at the mobile device from the user.

8. A method of controlling user access to a mobile device, comprising the steps of:
 (a) designating a vehicle telematics unit as a trusted wireless device using the mobile device;
 (b) receiving a user-defined geofence at the mobile device from a user;
 (c) establishing a short-range wireless link between the vehicle telematics unit and the mobile device after designating the vehicle telematics unit as the trusted wireless device;
 (d) detecting that the short-range wireless link currently exists between the vehicle telematics unit and the mobile device;
 (e) determining whether the mobile device is within the user-defined geofence; and
 (f) deactivating a passcode requirement used by the mobile device while the short-range wireless link exists between the mobile device and the vehicle telematics unit and the mobile device is within the user-defined geofence.

9. The method of claim 8, further comprising the step of re-activating the passcode requirement used by the mobile device when the short-range wireless link between the vehicle telematics unit and the mobile device ends or the mobile device leaves the user-defined geofence.

10. The method of claim 8, wherein the mobile device further comprises a smart phone.

11. The method of claim 8, further comprising the step of designating the vehicle telematics unit as trusted during an initial wireless pairing in response to input from a user of the mobile device.

12. The method of claim 8, further comprising the step of receiving the geo-fence at the mobile device from the user.

13. A method of controlling user access to a mobile device, comprising the steps of:
 (a) detecting at the mobile device the presence of a vehicle telematics unit via a short-range wireless signal;
 (b) identifying the vehicle telematics unit from the short-range wireless signal;
 (c) accessing at the mobile device a list that includes the identity of one or more trusted wireless devices;
 (d) comparing the identity of the vehicle telematics unit with the identity or identities included with the list of trusted wireless devices;
 (e) determining that the identity of the vehicle telematics unit is included with the list of trusted wireless devices;
 (f) determining that the mobile device and the vehicle telematics unit are located within a user-defined geo-fenced area; and
 (g) deactivating a passcode requirement used by the mobile device based on the determinations made in steps (e) and (f).

14. The method of claim 13, further comprising the step of re-activating the passcode requirement used by the mobile device when the short-range wireless signal is no longer present or the mobile device and the vehicle telematics unit are no longer located within the user-defined geo-fenced area.

15. The method of claim 13, wherein the mobile device further comprises a smart phone.

16. The method of claim 13, further comprising the step of designating the vehicle telematics unit as trusted during an initial wireless pairing in response to input from a user of the mobile device.

17. The method of claim 13, further comprising the step of receiving the user-defined geo-fenced area at the mobile device.

* * * * *